July 6, 1937.  H. D. GORDON ET AL  2,086,127
COFFEE MAKING APPARATUS
Filed Sept. 12, 1936
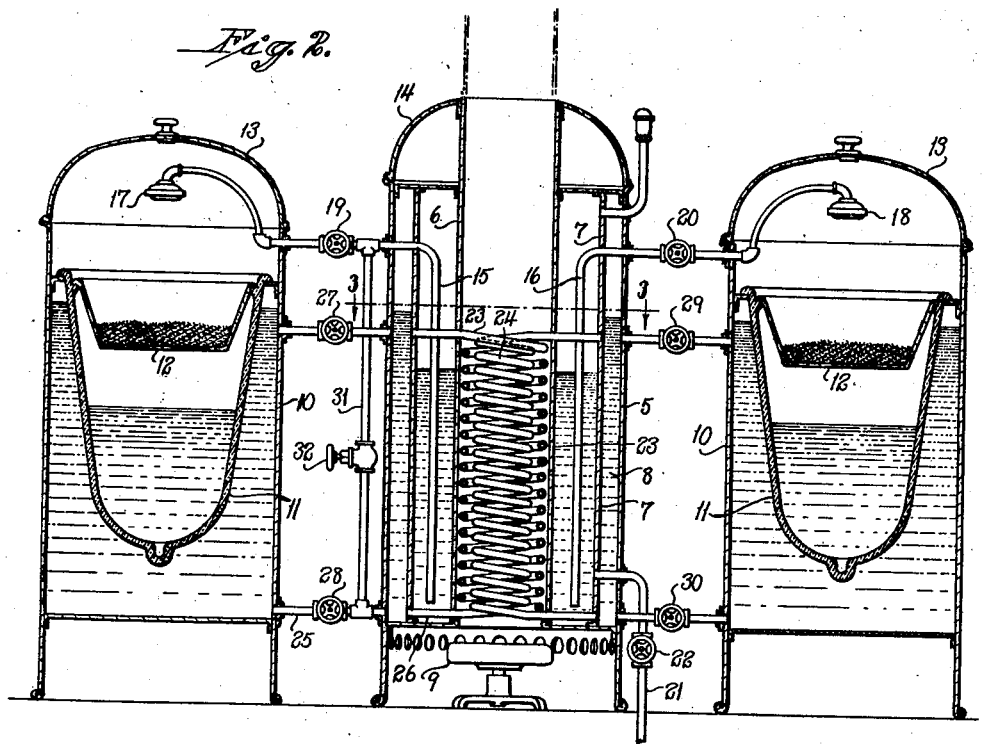
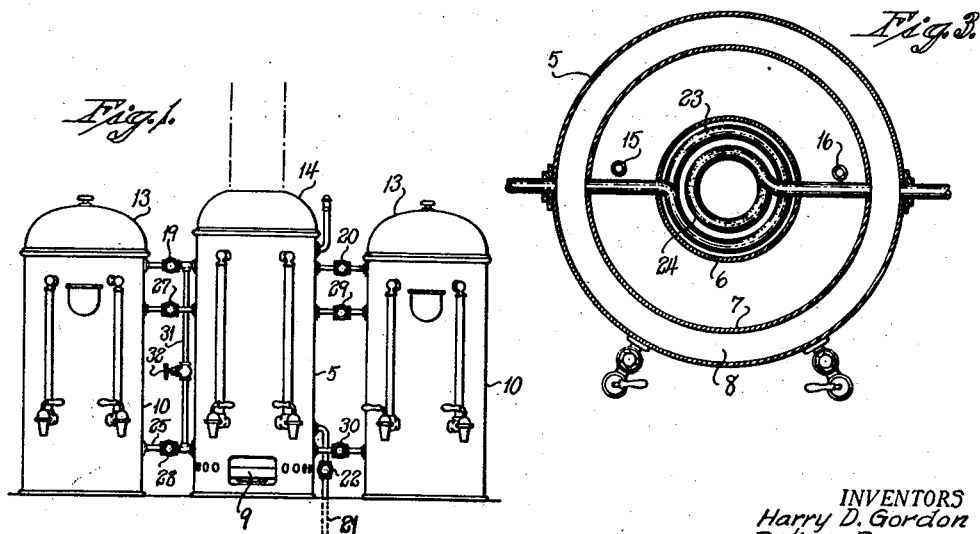
INVENTORS
Harry D. Gordon
Peter Pappas
BY
Seymour Earle & Nichols
ATTORNEYS.

Patented July 6, 1937

2,086,127

UNITED STATES PATENT OFFICE 2,086,127

COFFEE MAKING APPARATUS

Harry D. Gordon and Peter Pappas, New Haven, Conn.

Application September 12, 1936, Serial No. 100,518

3 Claims. (Cl. 53—3)

This invention relates to improvements in coffee making apparatus, and particularly to apparatus for use in restaurants or where large quantities of coffee are made, and which includes means for heating water and means for drawing the water from the heater and distributing it into the coffee making mechanism.

The object of the invention is to provide improved means for maintaining heat in the coffee making device.

The invention consists in the construction as hereinafter described, and particularly described in the claims.

In the accompanying drawing:

Fig. 1 is a front view of the coffee making machine constructed in accordance with our intentions;

Fig. 2 is a vertical, sectional view of the same;

Fig. 3 is a sectional view on the line 3—3 of Fig. 2.

In carrying out our invention we employ a water boiler 5 having a vertical flue 6 open at the bottom and open at the top for connection with a chimney or other ventilating means. Within the boiler, around the flue, is a cylindrical wall 7, forming a water jacket 8, and below the boiler is a heater 9, of any desired character. On either side of the boiler are urns 10, in each of which is a percolator 11, supporting a coffee container 12, and each closed at the top by a cover 13, the top of the boiler also being closed by a cover 14 which surrounds the upper end of the flue 6. As in the usual construction of devices of this character, siphon tubes 15, 16 extend from near the bottom of the boiler upward and outward to sprinklers 17 and 18, the passages thereto being adaptably opened or closed by valves 19 and 20. The water is furnished to the boiler by a pipe 21, the flow of water being controlled by a valve 22.

Within the flue are two coils, 23 and 24, one within the other, the upper end of the coil 23 extending into the jacket 8 and extending therefrom across to the upper end of the urn 10 into which it discharges, and the bottom of the urn 10 is connected by a pipe 25 with the water jacket, and the water jacket with the lower end 26 of the coil 23. Valves 27 and 28 control the circuit of water through the coils and through the urn.

On the other side, the upper end of the coil 24 extends into the other urn and connection is made with the lower end of this urn with the lower end of the coil 24, these connections being controlled by valves 29 and 30. The siphon 15 and the connection 25 are united by a pipe 31 provided with a valve 32 by which it may be operated or closed.

The operation of this device is practically the same so far as the circulation of water is concerned, but by providing the two coils directly above the burner, the water is more rapidly heated and can be maintained at a higher temperature than where the heat affects only the lower part of the boiler. We thus provide in a simple manner a very efficacious device for making coffee and maintaining it at the desired temperature.

We claim:

1. A coffee making apparatus including: a vertically-arranged tubular boiler and a coffee urn, said boiler provided with a vertically-arranged flue extending upward through the boiler and open at both ends; a cylindrical wall inside the boiler and around the flue, and forming a water-jacket; a coil arranged in said flue and having its ends communicating with the urn, a percolator mounted in the urn; a siphon-tube in the boiler and extended into the top of the urn, above the percolator; and a burner below the lower end of the flue.

2. A coffee making apparatus including: a vertically-arranged tubular boiler and an urn, said boiler provided with a vertically-arranged flue extending upward through the boiler and open at both ends; a cylindrical wall inside the boiler and around the flue, and forming a water-jacket; a coil arranged in said flue and having its ends communicating with the urn, a percolator mounted in the urn; a siphon-tube in the boiler and extended into the top of the urn, above the percolator; said siphon-tube also connected with the lower end of the water-jacket; and a burner below the lower end of the flue.

3. In a coffee making apparatus, the combination with a boiler and a plurality of urns, said boiler provided with a flue extending upward through the boiler and open at both ends; of a cylindrical wall, inside the boiler and around the flue, and forming a water-jacket; two coils, one arranged within the other in said flue, the ends of one coil communicating with one of the urns, and the ends of the other coil communicating with the other urn; a percolator mounted in each urn; siphon-tubes in the boiler, one extending into the top of one urn above the percolator therein, and the other extending into the top of the other urn above the percolator therein; and a burner below said coils.

HARRY D. GORDON.
PETER PAPPAS.